(12) United States Patent
Babin (10) Patent No.: US 7,378,842 B2
(45) Date of Patent: May 27, 2008

(54) THROUGH THE HOLE ROTARY POSITION SENSOR WITH NON-SYMMETRIC POLE PIECES

(75) Inventor: Brian George Babin, Williamsburg, VA (US)

(73) Assignee: Continental Automotive Systems US, Inc., Auburn Hills ( * ) Notice: Subject to any disclaimer, the term of this patent is extended or adjusted under 35 U.S.C. 154(b) by 0 days.

(21) Appl. No.: 11/776,040

(22) Filed: Jul. 11, 2007

(65) Prior Publication Data

US 2007/0252591 A1 Nov. 1, 2007

Related U.S. Application Data

(62) Division of application No. 10/438,670, filed on May 15, 2003, now Pat. No. 7,301,328.

(60) Provisional application No. 60/381,008, filed on May 15, 2002.

(51) Int. Cl.
*G01B 7/30* (2006.01)
(52) U.S. Cl. .............................. 324/207.25; 324/207.2; 324/207.21
(58) Field of Classification Search ..............................
324/207.2–207.25, 173–174; 338/32 R, 338/32 H
See application file for complete search history.

(56) References Cited

U.S. PATENT DOCUMENTS

| | | | |
|---|---|---|---|
| 3,194,990 A * | 7/1965 | Kendall | 310/10 |
| 3,751,691 A | 8/1973 | Ellis, Jr. | |
| 4,970,463 A | 11/1990 | Wolf et al. | |
| 5,164,668 A | 11/1992 | Alfors | |
| 5,444,369 A | 8/1995 | Luetzow | |
| 5,497,081 A | 3/1996 | Wolf et al. | |
| 5,528,139 A | 6/1996 | Oudet et al. | |
| 5,694,039 A | 12/1997 | Alfors | |
| 5,742,160 A | 4/1998 | Bergstedt et al. | |
| 5,757,181 A | 5/1998 | Wolf et al. | |
| 5,811,968 A | 9/1998 | Nakazawa | |
| 5,818,223 A | 10/1998 | Wolf | |
| 5,861,745 A | 1/1999 | Herden | |
| 5,880,367 A | 3/1999 | Vaughn | |
| 5,889,400 A | 3/1999 | Nakazawa | |

(Continued)

FOREIGN PATENT DOCUMENTS

DE 19719019 * 11/1997

(Continued)

OTHER PUBLICATIONS

International Search Report dated Sep. 8, 2003.

(Continued)

*Primary Examiner*—Jay M Patidar (57) ABSTRACT

A through the hole rotary position sensor which incorporates a single ring magnet with a central aperture. The rotating shaft whose angular position is to be sensed is received in the central aperture. The through the hole rotary position sensor includes a pair of pole pieces which extend around the circular magnet. Magnetic flux responsive elements are disposed adjacent the pole pieces. In order to shield the sensor from undesirable magnetic flux influences through the rotatable shaft, an internal shunt ring is provided around the exterior of the rotatable shaft. The circular magnet, pole pieces, magnetic flux responsive element, optional shunt rings and shunt discs are carried by a non-magnetic housing.

14 Claims, 10 Drawing Sheets

U.S. PATENT DOCUMENTS

| | | | |
|---|---|---|---|
| 6,043,645 A | 3/2000 | Oudet et al. | |
| 6,124,710 A | 9/2000 | Kordecki | |
| 6,130,535 A | 10/2000 | Herden et al. | |
| 6,163,148 A | 12/2000 | Takada et al. | |
| 6,188,216 B1 | 2/2001 | Fromer | |
| 6,198,275 B1 | 3/2001 | Wolf et al. | |
| 6,201,389 B1 * | 3/2001 | Apel et al. | 324/207.2 |
| 6,268,722 B1 | 7/2001 | Kogure et al. | |
| 6,275,025 B1 | 8/2001 | Wiese | |
| 6,437,962 B1 | 8/2002 | Muraji | |
| 6,448,761 B1 * | 9/2002 | Stumpe et al. | 324/207.2 |
| 6,462,537 B2 | 10/2002 | Kogure et al. | |
| 6,479,987 B1 | 11/2002 | Marx et al. | |
| 6,518,749 B1 | 2/2003 | Oudet et al. | |
| 6,559,637 B2 | 5/2003 | Miyata et al. | |
| 6,593,734 B1 | 7/2003 | Gandel et al. | |
| 6,693,421 B2 | 2/2004 | Wolf | |
| 6,710,593 B2 | 3/2004 | Babin et al. | |
| 7,116,100 B1 * | 10/2006 | Mock et al. | 324/207.25 |
| 7,298,395 B2 * | 11/2007 | Fukaya et al. | 348/149 |
| 2005/0104581 A1 * | 5/2005 | Miyata et al. | 324/207.25 |
| 2005/0140361 A1 | 6/2005 | Gandel et al. | |

FOREIGN PATENT DOCUMENTS

| | | |
|---|---|---|
| DE | 29821513 | 2/1999 |
| EP | 0 859 213 A1 * | 8/1998 |

OTHER PUBLICATIONS

European Search Report dated Nov. 9, 2006.

* cited by examiner

THROUGH THE HOLE ROTARY POSITION SENSOR WITH NON-SYMMETRIC POLE PIECES

REFERENCE TO RELATED APPLICATION

This application is a Divisional of U.S. application Ser. No. 10/438,670, which was filed on May 15, 2003 which claims priority to U.S. Provisional Application No. 60/381,008, which was filed on May 15, 2002.

BACKGROUND OF THE INVENTION

1. Field of the Invention

The present invention relates to a rotary position sensor and more particularly to a through the hole rotary position sensor.

2. Description of the Prior Art

Devices are known for providing a signal representative of the angular position of a rotatable device. In particular, potentiometers with moveable wiper contacts were known to be used to provide an electrical signal representative of the angular position of a rotatable member. Although such potentiometers provided satisfactory results, such potentiometers were subject to wear which increased the need and frequency of replacement of such devices, thus increasing warranty costs in automobile and commercial applications.

In order to solve this problem, non-contacting sensors have been developed to provide a signal representative of the angular position of a rotatable device. Such sensors, often referred to as rotary position sensors, are known to be used in many applications including applications in the automotive industry. These rotary position sensors are non-contacting and provide an electrical signal representative of the angular position of a rotatable member, such as various automotive applications as described below.

Such rotary position sensors normally include a circular magnet rigidly attached to a rotatable device whose angular position is to be measured. A magnetic flux responsive element sensitive to magnetic flux in one plane is typically disposed and mounted stationary relative to the magnet to receive components of the magnetic flux as the magnet and rotatable device are rotated. One or more pole pieces are also typically provided. In operation, as the combination of the rotatable device and magnet are rotated, components of magnetic flux are sensed by the magnetic flux responsive element causing the output of the magnetic flux responsive element to vary as a function of the angular position of the rotatable device.

Various magnetic flux responsive elements are known to be used in such applications. Probably the most popular is a Hall effect device which provides an electrical voltage signal as a function of the magnetic flux received in a particular plane. Magnetoresistive elements (MRE), for example, permalloy, are also known. Such magnetoresistive elements (MRE) provide an electrical resistance signal proportional to the magnetic flux in a particular direction. Thus, as the magnet rotates, components of magnetic flux in one plane will vary, causing the output signal from the Hall effect device or the MRE to vary to provide a signal representative of the angular position of the rotatable device.

Two types of rotary position sensors are known; end cap and so called through the hole rotary position sensors. The particular type of rotary position used is determined by the application.

Such end cap rotary position sensors are configured to be disposed and mechanically linked to the end of a rotatable shaft whose angular position is to be sensed. Examples of such rotary position sensors used in end cap applications are disclosed in commonly owned U.S. Pat. Nos. 5,497,081 and 5,818,223, hereby incorporated by reference. In general, rotary position sensors used in end cap applications normally include a circular magnet with a central aperture, a magnetic flux responsive element and one or more pole pieces. Normally the magnetic flux responsive element is disposed adjacent the pole pieces and centrally disposed within the central aperture of the circular magnet.

As mentioned above, through the hole rotary position sensors are also known. Such through the hole rotary position sensors also include a circular magnet with a central aperture. However, in through the hole applications, the shaft of the rotatable device, whose angular position is to be sensed, is received in the central aperture of the magnet. As such, when the rotatable shaft is rotated, the magnet rotates therewith. Such through the hole rotary position sensors also include a magnetic flux responsive element and one or more pole pieces disposed adjacent the outer diameter of the circular magnet.

Various through the hole rotary position sensors are known in the art. For example, through the hole rotary position sensors are disclosed, for example, in U.S. Pat. Nos. 5,444,369; 5,742,160; 6,124,710; 6,188,216; and 6,275,025. Such through the hole sensors often include custom magnets, while other sensors require more than one magnet resulting in relatively complicated and expensive sensors. For example, the '216 patent discloses a sensor that requires two magnets, while the '710 patent requires a disc-shaped magnet. Similarly, the '025 and '369 patent also require irregular shaped magnets which can add to the cost and complexity of the sensor. Thus, there is a need for a through the hole rotary position sensor that can be formed with a relatively standard ring magnet to reduce the cost and complexity of the overall device.

SUMMARY OF THE INVENTION

Briefly, the present invention relates to a through the hole rotary position sensor which incorporates a single ring magnet with a central aperture. The rotating shaft whose angular position is to be sensed is adapted to be received in the central aperture. The through the hole rotary position sensor in accordance with the present invention also includes a pair of pole pieces which extend at least partially around the circular magnet. One or more magnetic flux responsive elements are disposed adjacent the pole pieces. In order to shield the sensor from undesirable external magnetic flux and external parasitic magnetic flux drains through the rotatable shaft, an internal shunt ring may be provided around the exterior of the rotatable shaft. In addition, exterior shunt components, external to the magnet, such as an external shunt ring and/or top and bottom shunt discs for shielding the sensor from external magnetic flux and external parasitic magnetic flux drains, are optionally included. The circular magnet, pole pieces, magnetic flux responsive element, internal shunt ring and external shunt devices are carried by a non-magnetic housing. By utilizing a simple circular or ring magnet, the cost and complexity of the sensor is relatively lower relative to other known sensors.

DESCRIPTION OF THE DRAWINGS

These and other advantages of the present invention will be readily known with respect to the following specification and attached drawing wherein.

DETAILED DESCRIPTION OF THE PREFERRED EMBODIMENT

The present invention relates to a through the hole rotary position sensor, generally illustrated in FIGS. 1A-1D and identified with the reference numeral 20. The through the hole rotary position sensor 20 is adapted to be used in applications requiring the shaft to extend through the sensor. One such application of a through the hole rotary position sensor is a transmission shift position sensor, for example, as disclosed in commonly owned U.S. provisional patent application 60/430,991, filed Dec. 4, 2002, hereby incorporated by reference. In addition to that application, the through the hole rotary position sensor 20 in accordance with the present invention is adapted to be used in various other automobile applications, such as throttle position, pedal position, exhaust gas recirculation (EGR), seat position, steering position and suspension height, as well as other applications.

Figure 1A:
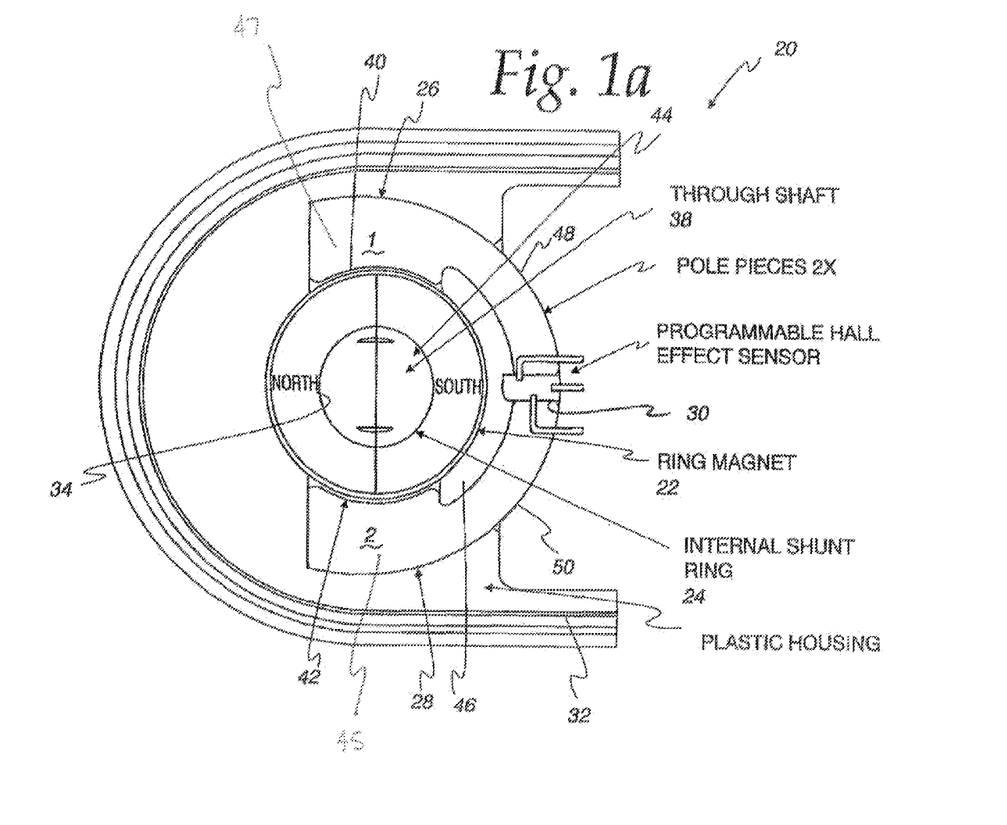
FIG. 1A is a plan view of a through the hole rotary position sensor in accordance with the present invention.
Figure 1B:
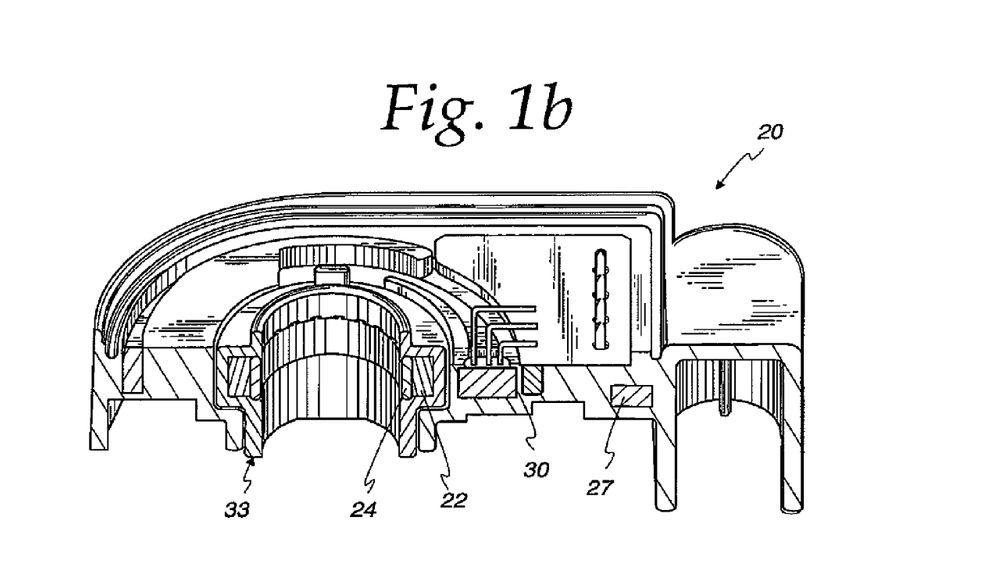
FIG. 1B is a partial perspective view of the through the hole sensor illustrated in FIG. 1A, shown in section and illustrating an optional external shunt ring and further illustrated with a portion of the inner diameter of the drive arm assembly removed to show the optional internal shunt ring.
Figure 1C:
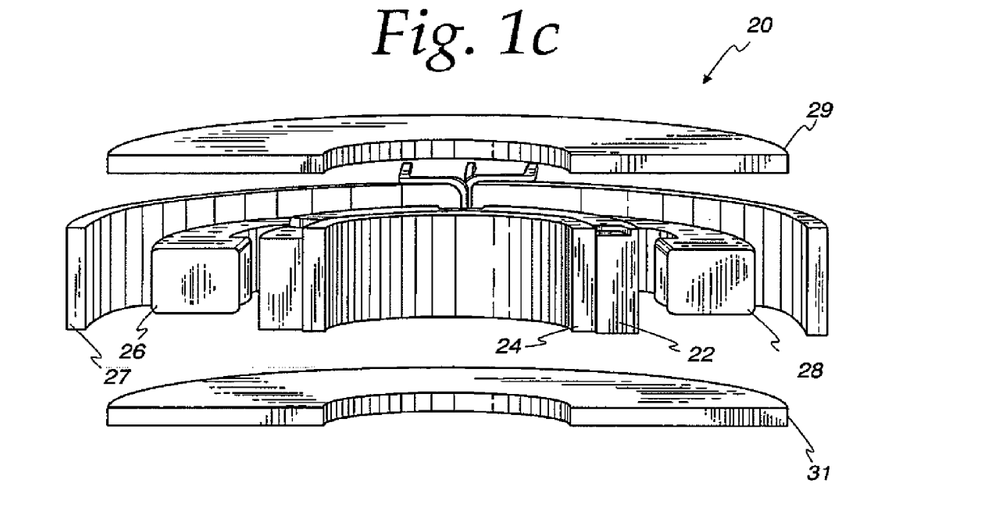
FIG. 1C is an elevational view shown in section of the sensor shown in FIG. 1A, shown with the housing removed for clarity and further shown with an optional external shunt ring and optional external top and bottom shunt discs.
Figure 1D:
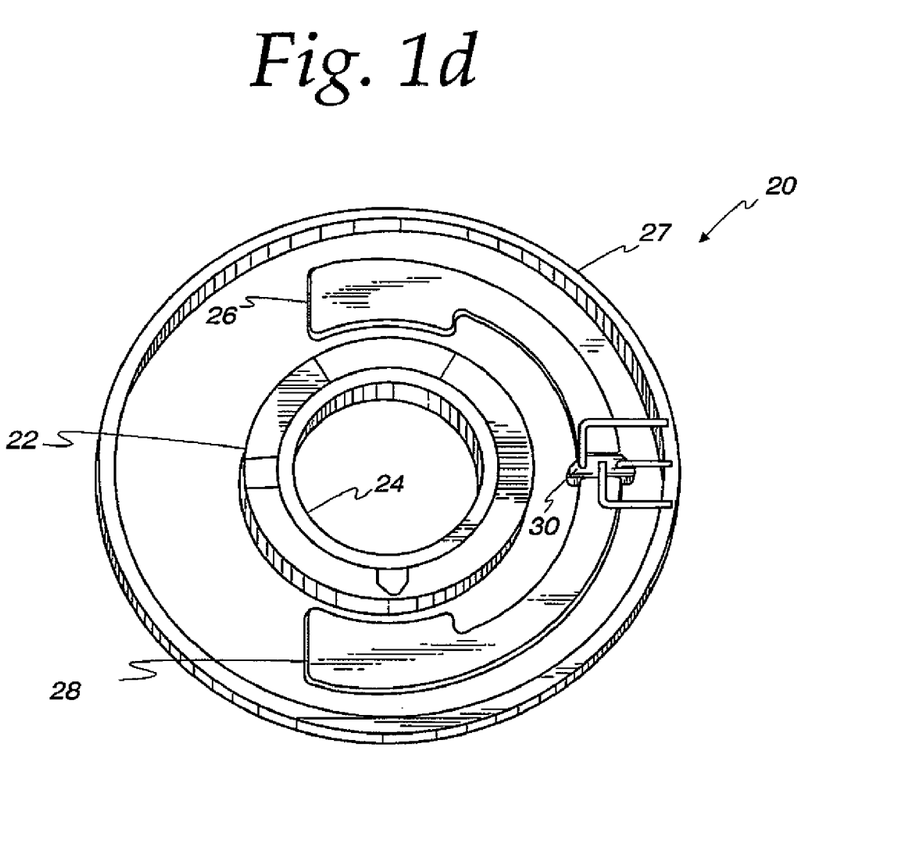
FIG. 1D is a plan view of the sensor shown in FIG. 1B, shown with the housing removed for clarity.

Referring to FIGS. 1A-1D, the through the hole rotary position sensor 20 in accordance with the present invention includes a circular or ring magnet 22, an optional internal shunt ring 24, a pair of pole pieces 26 and 28, and one or more magnetic flux responsive elements 30. As best shown in FIGS. 1C and 1D, the sensor 20 may also include an optional external shunt ring 27 and top and/or bottom shunt discs 29 and 31. The circular magnet 22, optional shunt rings 24 and 27, optional shunt discs 29 and 31, pole pieces 26, 28 and one or more magnetic flux responsive elements 30 are carried in a non-magnetic housing 32, for example, a plastic housing. The ring magnet 22 may be, for example, a circular magnet with a central aperture 34. The ring magnet 22 may be, for example, a two pole magnet, as shown, having opposing North and South magnetic pole and magnetized with either a radial or diametric magnetization.

The ring magnet 22 may be formed as a bonded anistropic or isotropic barium ferrite or strontium ferrite magnet. Other magnet materials are also suitable in either an isotropic or an anistropic state.

The through shaft may be formed from, for example, low carbon steel 1008 or 1010, high carbon steel or any other material. The through shaft 38 and magnet 22 are configured to rotate together. The shaft 38 may press fit into a plastic drive arm, which, in turn, is disposed within the central aperture 34 of the circular magnet 22 to rotate therewith. In particular, as best shown in FIG. 1B, a molded drive arm assembly 33 may be formed from a non-magnetic material, such as plastic, and used to carry the circular magnet 22 and the optional internal shunt ring 24. For clarity, FIG. 1B is shown with the internal shunt ring 24 visible through the inner diameter of the drive arm 33. In actuality, the internal shunt ring 24 is embedded into the plastic such that there can be no contact between the internal shunt ring 24 and any magnetically conductive through shaft 38.

Various commonly known methods for causing the shaft 38 to rotate with the magnet 22 are known. For example, the inner diameter of the drive arm assembly 33 may be provided with crush ribs, which, when pressed into the central aperture 34, result in a friction fit with the magnet 22. The through shaft 38 can alternatively be provided with a spline (not shown) that is adapted to be received in, for example, a keyway (not shown) formed in the inner diameter of the drive arm assembly 33. All known methods for configuring the through shaft 38 to rotate with the ring magnet 22 are considered to be within the broad scope of the invention.

In order to prevent external undesirable flux and external undesirable parasitic flux drains ("undesirable magnetic flux influences") from affecting the operation of the sensor 20, an internal shunt ring 24 may optionally be disposed between the through shaft 38 and the magnet 22. By disposing an internal shunt ring 24 adjacent the through shaft 38, any undesirable magnetic flux influences transmitted through the shaft 38 is shielded and thus prevented from affecting the operation of the magnetic flux responsive element 30. In alternate embodiments in which the shaft 38 is fabricated from non-magnetically transmissive materials, the internal shunt ring 34 may be eliminated. In addition, in embodiments in which external parasitic flux is not a concern, the internal shunt ring 24 may also be eliminated. As shown best in FIG. 1C, an external shunt ring 27, and/or top and/or bottom shunt discs 29 and 31 may also be used to shield the sensor from such external undesirable magnetic flux influences.

As mentioned above, the sensor 20 includes two pole pieces 26 and 28. As shown, the pole pieces 26 and 28 may be formed in one exemplary embodiment as shown in FIGS. 1A-1D as arcuate members and may be symmetrical. These exemplary pole pieces 26 and 28 each include circular surfaces 40 and 42 which are adapted to be disposed adjacent the outer diameter of the magnet 24 across a relatively uniform air gap. The pole pieces 26, 28 may be formed in a configuration as a quaffer circle with arcuate slots 44 and 46. The arcuate slots define extending fingers 48 and 50. The circular surfaces 40 and 42 of the pole pieces 26, 28, respectively, form pick up heads 45, 47 for enhancing performance of the sensor 20. The pick up heads 45, 47 configuration as well as the arcuate slots 44 and 46 allow the magnetic flux responsive element 30 to be placed further away from the magnet, thus enhancing the overall performance of the sensor 20. The pick up heads 45, 47 are thicker in a radial direction than fingers 48 and 50 that extend therefrom. As shown the extending fingers 48 and 50 are configured to sandwich the magnetic flux responsive element 30 therebetween.

Figure 2A:
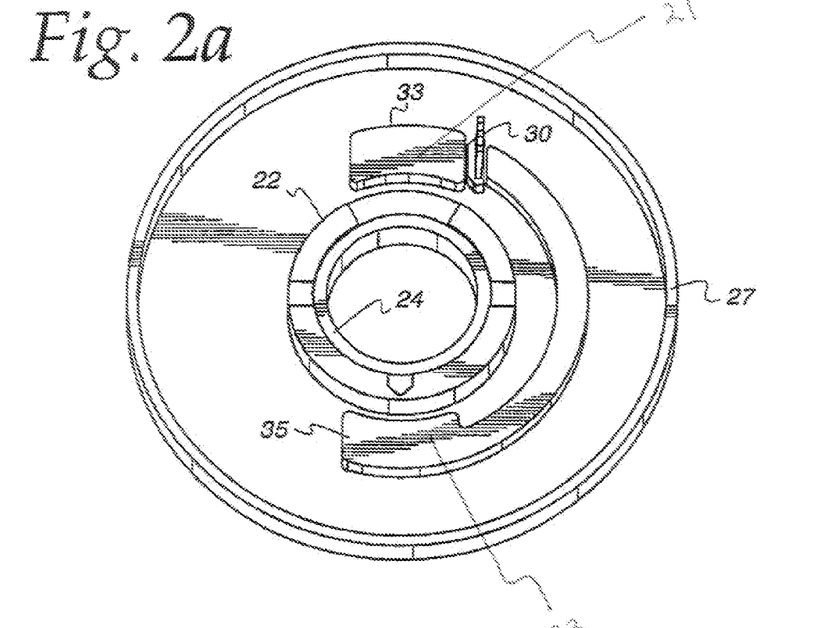
FIGS. 2A-2C are plan views of alternate embodiments of the invention, shown with the housing removed for clarity, illustrating various embodiments with non-symmetrical pole pieces.
Figure 2B:
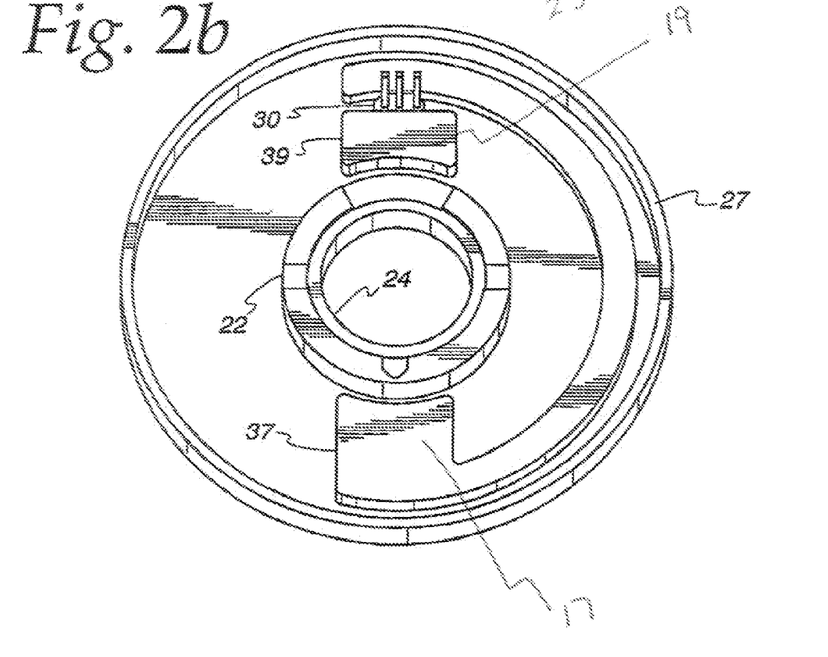
Figure 2C:
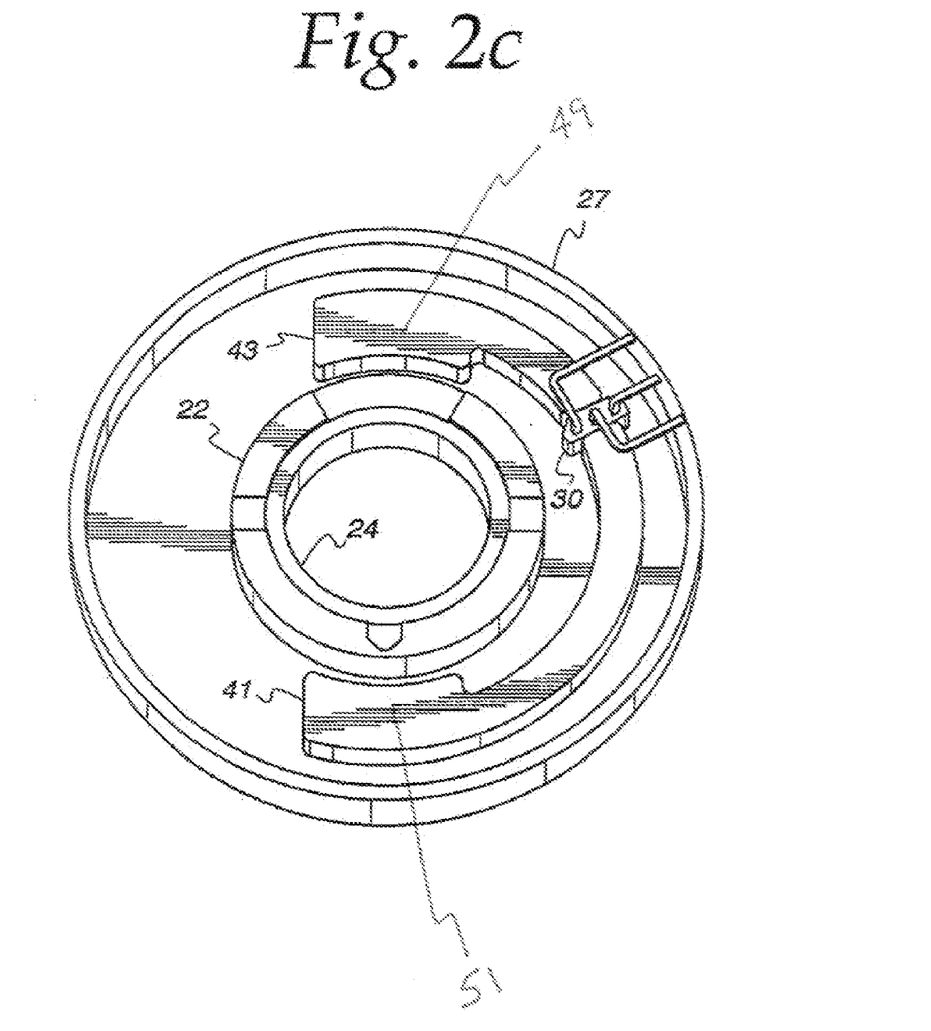

Other configurations of the pole pieces are also possible, both symmetrical and non-symmetrical. For example, various exemplary embodiments of non-symmetrical pole pieces are illustrated in FIGS. 2A-2C. In particular, FIG. 2A illustrates a pair of exemplary non-symmetrical pole pieces identified with the reference numerals 33 and 35. The non-symmetrical pole pieces 33 and 35 include pick up heads 21 and 23. FIG. 2B illustrates another exemplary pair of non-symmetrical pole pieces 37 and 39 that include pick up heads 17 and 19. Finally, FIG. 2C illustrates yet another exemplary pair of non-symmetrical pole pieces 41 and 43 with pick up heads 49 and 51. Also, non-circular shapes are possible.

Various devices can be used for the magnetic flux responsive element 30 including Hall effect sensors, reed switches, magnetoresistive (MR) devices including giant MR (GMR) devices and other magnetoresistive elements (MRE), for example, devices formed from a permalloy material. Such sensors all provide an electrical output signal in response to a change in magnetic flux along a particular direction. The magnetic flux responsive element 30 may also be a programmable device, such as a monolithic integrated circuit which provides an output voltage proportional to the magnetic flux sensed and proportional to the supply voltage. Various Hall effect devices are suitable for use in the present invention. For example, Micronas Type HAL 805, 810, 815, etc., or equivalent programmable devices, for example as available from Melexis and Infineon. Alternatively, a non-programmable Hall effect device can be used, for example, Allegro Model No. A3515 and A3516 and used in conjunction with programmable circuitry for example as disclosed in commonly owned U.S. Pat. Nos. 5,757,181 and 6,198,275, hereby incorporated by reference. All such magnetic flux responsive elements are considered to be within the broad scope of the present invention.

Figure 3A:
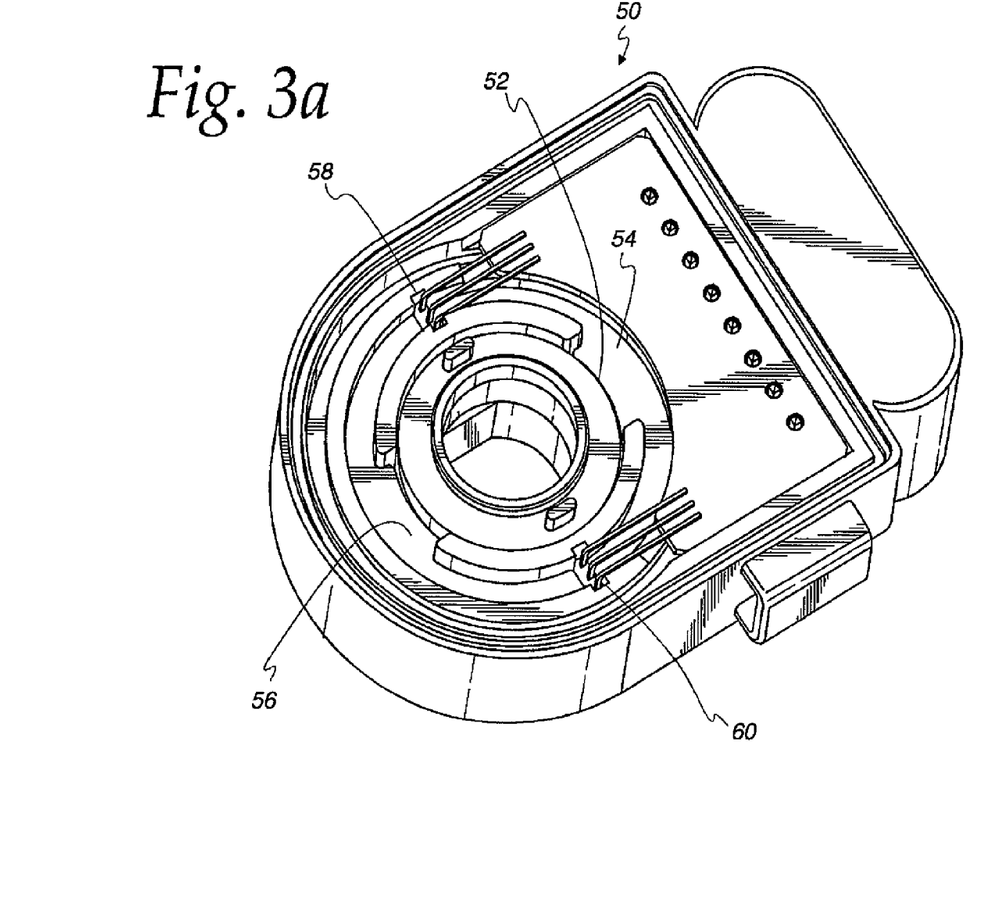
FIG. 3A is a perspective view of another alternate embodiment of the invention illustrating the use of two magnetic flux responsive devices.
Figure 3B:
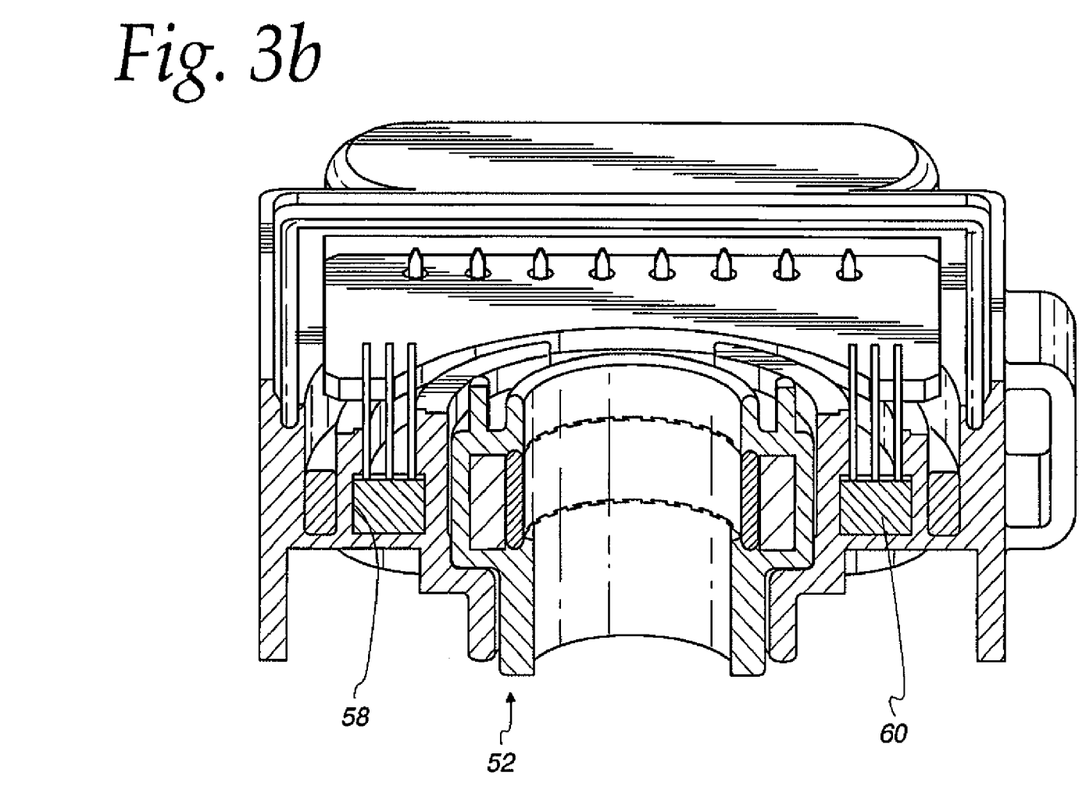
FIG. 3B is a sectional view of the embodiment illustrated in FIG. 3A.

Embodiments are also contemplated in which more than one magnetic flux responsive element is contemplated. Examples of these embodiments are illustrated in FIGS. 3A, 3B, 4A and 4B. These embodiments provide a backup magnetic flux responsive element to compensate for failure of the other magnetic flux responsive element. Referring first to FIGS. 3A and 3B, the sensor, generally identified with the reference numeral 50, includes a drive arm assembly 52 as described above, a pair of pole pieces 54 and 56, and a pair of magnetic flux responsive elements 58 and 60 shown sandwiched between the pole pieces 54 and 56.

Figure 4A:
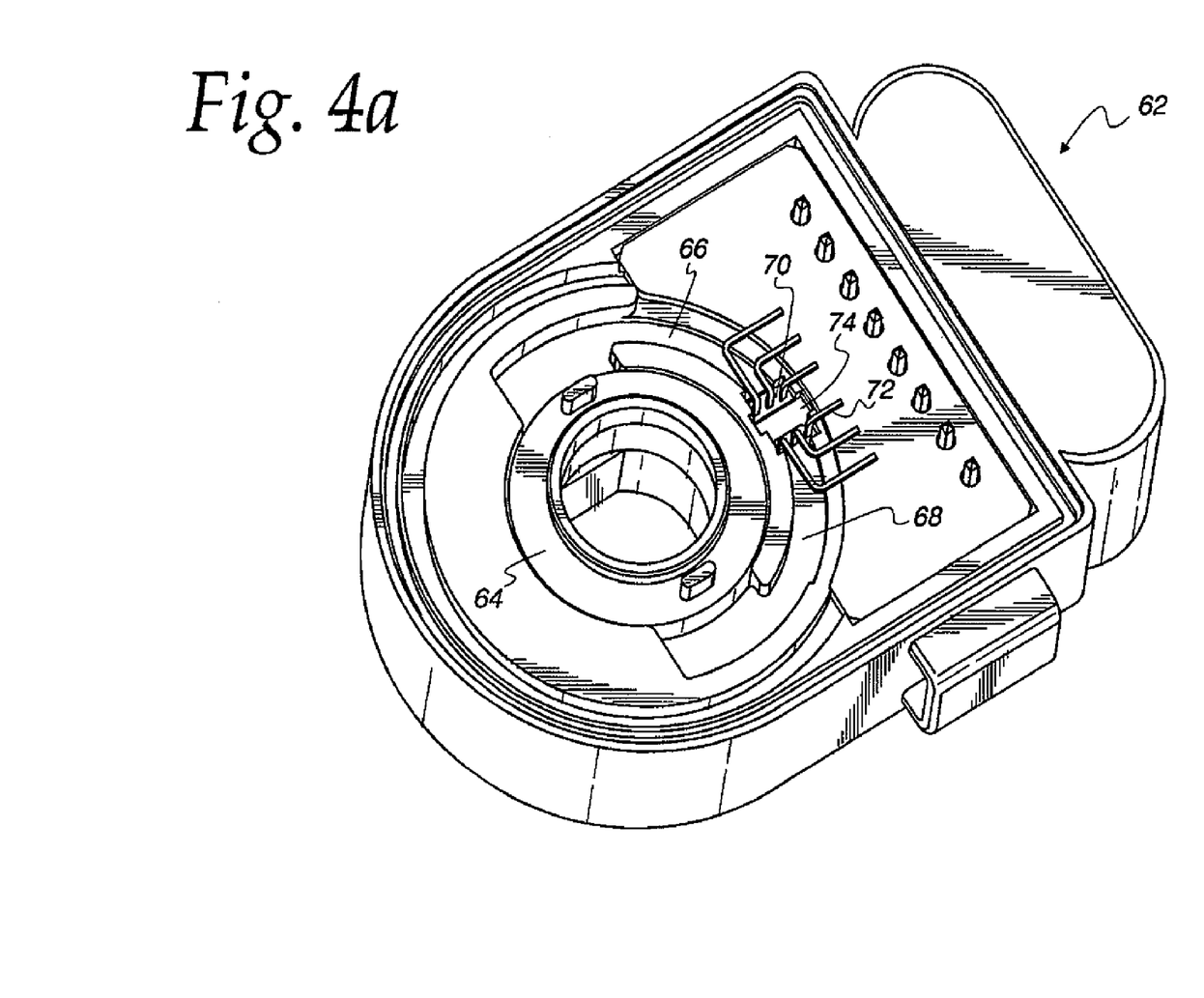
FIG. 4A is similar to FIG. 3A but illustrating a different alternate embodiment.
Figure 4B:
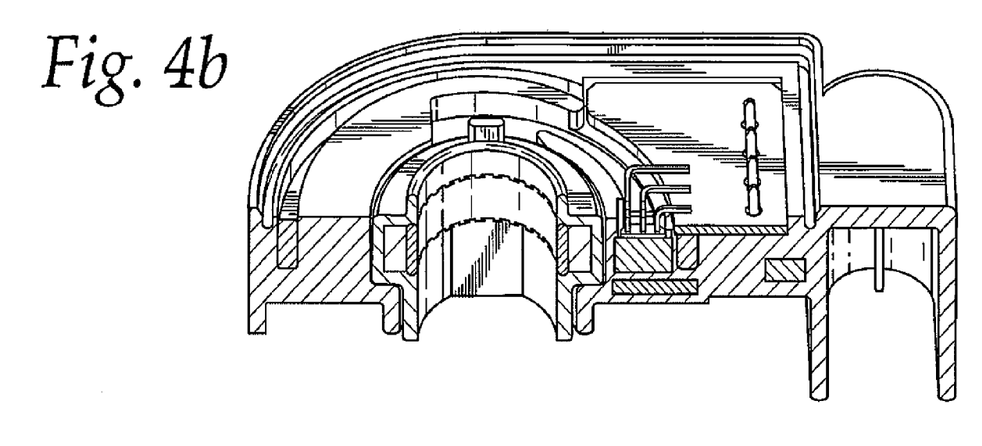
FIG. 4B is a sectional view of the embodiment illustrated in FIG. 4A.

FIGS. 4A and 4B illustrate another exemplary embodiment, generally identified with the reference numeral 62. The sensor 62 includes a drive arm assembly 64, a pair of pole pieces 66 and 68 and a pair of magnetic flux responsive elements 70 and 72. As shown, the magnetic flux responsive elements 70 and 72 are shown separated by a spacer 74. However, embodiments are also contemplated without the use of a spacer in which the magnetic flux responsive elements are back to back.

Figure 5:
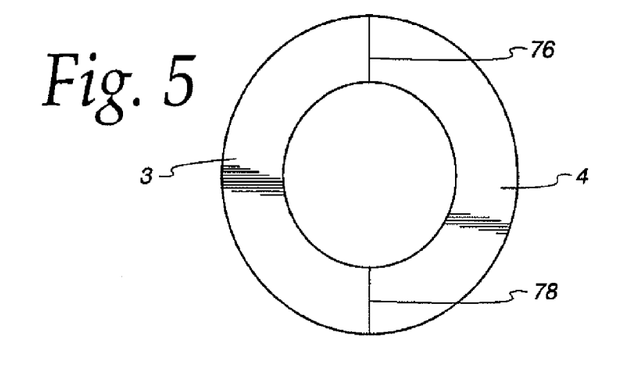
FIG. 5 is a plan view of the circular magnet for use with the present invention illustrating the null points and points of maximum magnetic flux.

Before getting into the operation of the sensor, the orientation of the magnet is defined. In particular, referring to FIGS. 1 and 5, the circular magnet 22 includes a magnetic null as represented by the vertical lines 76 and 78. The position of maximum magnetic flux along the circular magnet 22 is at a point approximately 90.degree. from the magnetic null, identified as points 3 and 4. As shown in FIG. 1, the magnetic null is aligned with the points 1 and 2 on the pole pieces 26 and 28.

In operation, as the points 3, 4 of maximum magnetic flux of the magnet 22 approach the locations identified as 1 or 2 on the pole pieces 26 and 28 respectively, components of the magnetic field pass through the magnetic flux responsive element 30. This change in magnetic field strength or flux is translated to an output signal by the magnetic flux responsive element 30. For a Hall effect device, the change is translated into an output voltage. When the points 3, 4 of maximum magnetic flux are perpendicular to the points 1 and 2 on the pole pieces 26 and 28, respectively (i.e. the position as shown in FIG. 1), no magnetic field is detected by the magnetic flux responsive element 30. The maximum field through the magnetic flux responsive element 30 occurs when points 3, 4 are in line with the points 1 and 2 on the pole pieces 26 and 28. In other words, the maximum field through the magnetic flux 30 occurs when the magnet is rotated plus or minus 90 degrees from the position illustrated in FIG. 1.

Figure 6:
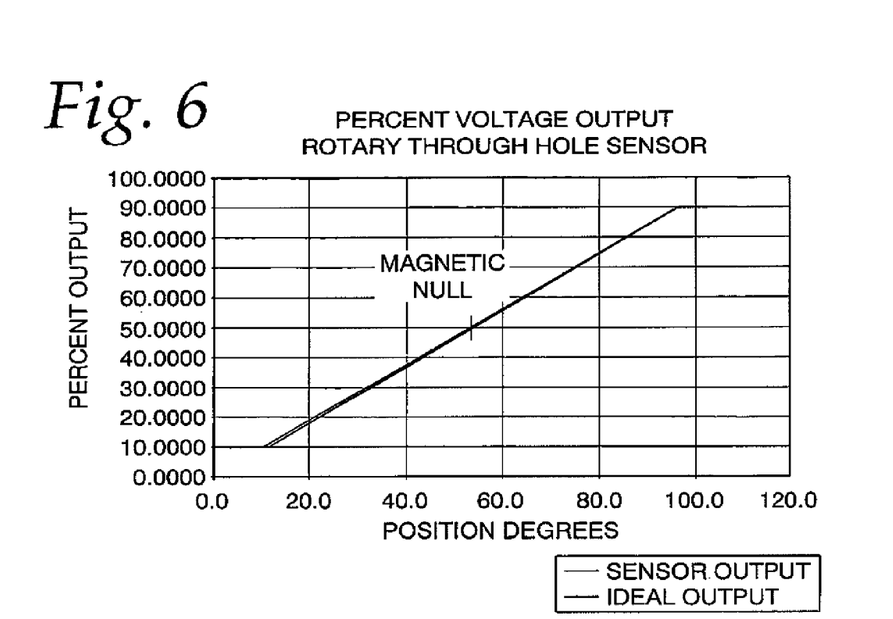
FIG. 6 is a graphical illustration of the percent output as a function of rotary position of the rotary position sensor in accordance with the present invention.

FIG. 6 is a graphical representation of the percent output of an exemplary Hall effect sensor 20 utilizing a Hall effect device as a magnetic flux responsive element. The horizontal axis relates to a position in degrees of rotation of the sensor 20 while the vertical axis relates to percent output voltage. As shown, from about 10 degrees to better than 90 degrees, the output of the sensor is linear and varies from about 10% voltage output to about 90% voltage output.

Figure 7:
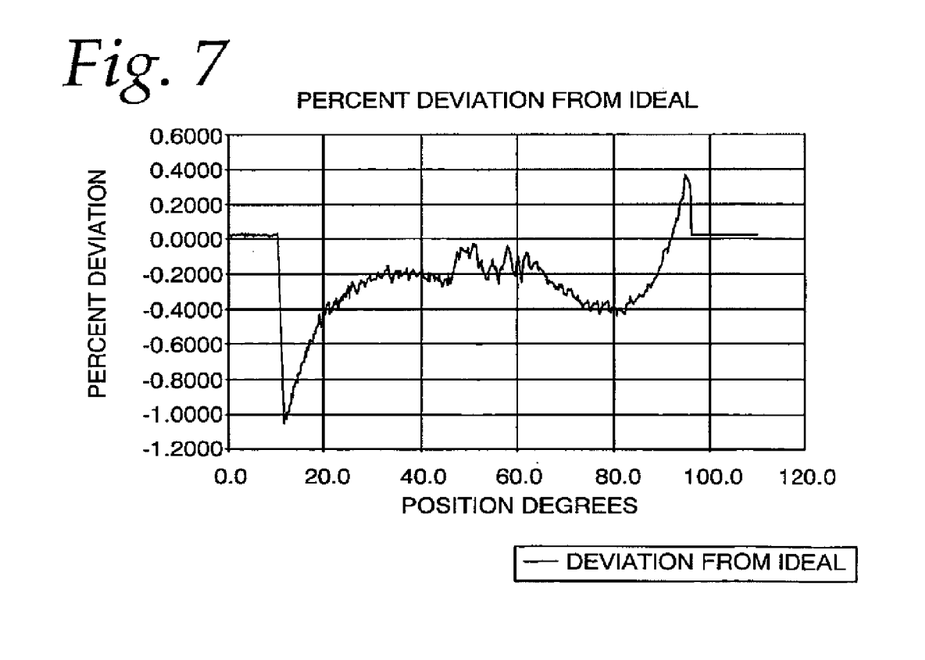
FIG. 7 is a graphical illustration of the percent deviation as a function of position in degrees of the rotary position sensor in accordance with the present invention.

Over the angular range the sensor output deviates from an ideal output by no more than approximately 1 percent. In particular, FIG. 7 illustrates the percent deviation from an ideal output at 25.degree. C. The percent deviation is shown on the vertical axis as a function of the angular rotation on the horizontal axis. As shown, the maximum deviation occurs at around 10 degrees (approximately −40.degree. from the null) and about 90 degrees (approximately +40.degree. from the null). At about 10 degrees, the sensor output voltage deviates from the ideal voltage by a little over minus 1 percent. At the other end of the scale, at better than 90 degrees, the sensor output varies from the ideal output at about 0.4 percent.

Obviously, many modifications and variations of the present invention are possible in light of the above teachings. Thus, it is to be understood that, within the scope of the appended claims, the invention may be practiced otherwise than as specifically described above.

What is claimed is:

1. An angular position sensor comprising:
   a circular magnet with a central aperture, said central aperture to receive a through shaft;
   first and second pole pieces partially disposed around the periphery of said circular magnet defining a first air gap between the first and second pole pieces and the circular magnet and a second air gap between the first and second pole pieces, wherein the first pole piece includes an arcuate length about the circular magnet different than an arcuate length of the second pole piece; and
   a magnetic flux responsive element for sensing magnetic flux disposed in one or the other of said first air gap and said second air gap.

2. The angular position sensor as recited in claim 1, wherein the first pole piece includes a first pick up head corresponding with the circular magnet to define the first air gap.

3. The angular position sensor as recited in claim 2, wherein the second pole piece includes a second pick up head defining the first air gap and a second finger extending arcuately from the second pick up head to the first pick up head.

4. The angular position sensor as recited in claim 3, wherein said second air gap is defined between the first pick up head and the second finger.

5. The angular position sensor as recited in claim 3, including a first finger extending arcuately from said first pick up head, wherein the first finger is of a different arcuate length than the second finger.

6. The angular position sensor as recited in claim 1, wherein the magnetic flux responsive element is disposed in the second air gap.

7. The angular position sensor as recited in claim 3, wherein the first pick up head and the second pick up head both include a thickness in a radial direction greater than the second finger.

8. The angular position sensor as recited in claim 3, wherein the first pick-up head and the second pick up head include an radial surface corresponding to the radius of the circular magnet.

9. An angular position sensor comprising
a circular magnet with a central aperture, said central aperture to receive a through shaft;
a first pole piece including a first pick-up head and a first finger;
a second pole piece including a second pick-up head and a second finger, wherein the first pole piece and the second pole piece are disposed around a periphery of the circular magnet and the first finger is longer than the second finger;
a magnet air gap defined between each of the first and second pick up heads and the circular magnet;
a sensor air gap disposed between the first and second fingers; and
a magnetic flux responsive element for sensing magnetic flux disposed in the sensor air gap.

10. The angular position sensor as recited in claim 9, wherein each of the first pick up head and the second pick up head include a radial thickness that is larger than a radial thickness of either of the first and second fingers.

11. The angular position sensor as recited in claim 10, wherein each of the first pick up head and the second pick up head include an arcuate surface corresponding to a periphery of the circular magnet.

12. The angular position sensor as recited in claim 9, wherein the first finger and the second finger extend arcuately from the corresponding first and second pick up head.

13. The angular position sensor as recited in claim 9, wherein the magnetic flux responsive element is disposed transverse to an axis of the circular magnet for measuring magnetic flux between the first pole piece and the second pole piece.

14. The angular position sensor as recited in claim 9, wherein the first pole piece and the second pole piece include a uniform thickness in an axial direction parallel to an axis of the circular magnet.

* * * * *